United States Patent
Won et al.

(10) Patent No.: US 9,866,281 B2
(45) Date of Patent: Jan. 9, 2018

(54) WIRELESS POWER TRANSMISSION APPARATUS AND METHOD THEREFOR

(71) Applicant: INTELLECTUAL DISCOVERY CO., LTD., Seoul (KR)

(72) Inventors: Yun Jae Won, Seoul (KR); Seung Ok Lim, Seongnam-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 260 days.

(21) Appl. No.: 14/784,774

(22) PCT Filed: Apr. 17, 2014

(86) PCT No.: PCT/KR2014/003378
§ 371 (c)(1),
(2) Date: Oct. 15, 2015

(87) PCT Pub. No.: WO2014/171774
PCT Pub. Date: Oct. 23, 2014

(65) Prior Publication Data
US 2016/0065005 A1 Mar. 3, 2016

Related U.S. Application Data

(60) Provisional application No. 61/812,988, filed on Apr. 17, 2013.

(30) Foreign Application Priority Data

Apr. 30, 2013 (KR) .................. 10-2013-0048839

(51) Int. Cl.
*H02J 7/02* (2016.01)
*H04B 5/00* (2006.01)
(Continued)

(52) U.S. Cl.
CPC ............ *H04B 5/0037* (2013.01); *H02J 5/005* (2013.01); *H02J 7/025* (2013.01); *H02J 17/00* (2013.01);
(Continued)

(58) Field of Classification Search
CPC .... H04B 5/0037; H04B 5/0075; H02J 17/025
See application file for complete search history.

(56) References Cited

U.S. PATENT DOCUMENTS

2009/0153417 A1* 6/2009 Chen .................. H01Q 3/24
343/702
2012/0248891 A1 10/2012 Drennen
(Continued)

FOREIGN PATENT DOCUMENTS

| CN | 101447683 A | 6/2009 |
| CN | 102983636 A | 3/2013 |

(Continued)

OTHER PUBLICATIONS

Communication dated Apr. 28, 2017 from the State Intellectual Property Office of People's Republic of China in counterpart Application No. 201480022360.X.
(Continued)

*Primary Examiner* — Jeffrey Shin
(74) *Attorney, Agent, or Firm* — Sughrue Mion, PLLC

(57) ABSTRACT

The present invention relates to a wireless power transmission apparatus and a method therefor. The present invention provides a wireless power transmission apparatus including: a power transmission module; a first communication module; a second communication module; and a controller for searching out a first wireless power reception device performing wireless power transmission/reception, transmitting a second magnetic field signal of a second frequency band through the power transmission module, sensing a second (Continued)

response signal to the second magnetic field signal through the second communication module, and searching out a second wireless power reception device performing wireless power transmission/reception by means of the second frequency band according to whether the second response signal is received.

16 Claims, 12 Drawing Sheets

(51) Int. Cl.
*H02J 17/00* (2006.01)
*H02J 5/00* (2016.01)
(52) U.S. Cl.
CPC .......... *H04B 5/0062* (2013.01); *H04B 5/0075* (2013.01); *Y10T 307/25* (2015.04)

(56) References Cited

U.S. PATENT DOCUMENTS

| | | |
|---|---|---|
| 2012/0306269 A1 | 12/2012 | Kim et al. |
| 2013/0057205 A1 | 3/2013 | Lee et al. |
| 2013/0065518 A1 | 3/2013 | Byun et al. |

FOREIGN PATENT DOCUMENTS

| | | |
|---|---|---|
| KR | 10-2012-0134999 A | 12/2012 |
| KR | 10-2013-0003965 A | 1/2013 |
| KR | 10-2013-0026977 A | 3/2013 |
| WO | 2009/140217 A2 | 11/2009 |

OTHER PUBLICATIONS

International Search Report of PCT/KR2014/003378 dated Jul. 21, 2014.

* cited by examiner

WIRELESS POWER TRANSMISSION APPARATUS AND METHOD THEREFOR

CROSS REFERENCE TO RELATED APPLICATIONS

This application is a National Stage of International Application No. PCT/KR2014/003378, filed Apr. 17, 2014, claiming priority based on U.S. Provisional Patent Application No. 61/812,988 filed Apr. 17, 2013 and Korean Patent Application No. 10-2013-0048839 filed Apr. 30, 2013, the contents of all of which are incorporated herein by reference in their entirety.

BACKGROUND OF THE INVENTION

Field of the Invention

The following description relates to a wireless power transmitter and a method for transmitting power wirelessly and, more particularly, to a wireless power transmitter, which searches for a plurality of wireless power receivers using different wireless power transceiving standards, and a method for transmitting power wirelessly.

Related Art

A wireless power transmission technology is a technology of transmitting power wirelessly between a power source and an electronic device. For example, the wireless power transmission technology may provide greater mobility, convenience, and safety than a wired charging environment using the existing wired charging connector, simply by putting a mobile terminal, such as a smart phone and a tablet, on a wireless charging pad. In addition, the wireless power transmission technology is considered to replace the existing wired power transmission environment when it comes to not only wireless charging of mobile terminals, home appliances, electric automobiles, but also other various fields including medical industries, leisure, robots, and the like.

The wireless power transmission technology, which can be classified as a technology utilizing electromagnetic radiation and electromagnetic induction, is not highly efficient because of radiation loss that occurs in the air. To solve this drawback, efforts have been made to develop a technology that utilizes mainly electromagnetic induction.

Wireless power transmission technologies using electromagnetic induction are classified mainly into an inductive coupling scheme and a resonant magnetic coupling scheme.

The inductive coupling scheme is a method in which a magnetic field is radiated by a coil of a transmitter due to electromagnetic field coupling between the coil of the transmitter and a coil of a receiver and energy is transferred using current induced to the receiver. The inductive coupling scheme has an advantage of high transmission efficiency; however, its power transmission distance is limited to few mm and it is so sensitive to coil matching, so that it has a very low degree of location freedom.

The resonance magnetic coupling scheme is a method that has been proposed by Professor Marin Soljacic at MIT in 2005, the method in which energy is transferred using a phenomenon where a magnetic field is focused at both ends of a transmitter and a receiver due to a magnetic field applied with a resonant frequency between a coil of the transmitter and a coil of the receiver.

The resonance magnetic coupling scheme enables transmitting energy from few cm to few m, which is a transmission range larger than that of the inductive coupling scheme, and transmitting power using multiple devices at the same time. Thus, the resonance magnetic coupling scheme is expected as a wireless power transmission scheme that will embody real cord-free transmission.

However, there are too various standards in the wireless power transmission field. The typical standards are of Qi standard of the Wireless Power Consortium, an Alliance For Wirless Power (A4WP) standard led by Qualcomm and Samsung, a Power Matteres Alliance (PMA) standard led by Power Matteres. Under this circumstance, if a wireless power transmitter and a wireless power receiver comply with different standards, wireless power is not able to be transmitted and received between the wireless power transmitter and the wireless power receiver.

SUMMARY OF THE INVENTION

The present invention aims to provide a wireless power transceiver which searches for a plurality of wireless power receivers using different wireless power transceiving standards, and a wireless power transmission method.

The object of the present invention is not limited to said aiming, and the person ordinarily skilled in the art can clearly understand other objects, which are not mentioned here, by the description and the drawings.

In an aspect, there is provided a wireless power transmitter including: a power transmitting module configured to transmit wireless power using one of a magnetic field of first frequency band and a magnetic field of second frequency band that is different from the first frequency band; a first communication module; a second communication module; and a controller configured to transmit a first magnetic field signal of the first frequency band through the power transmitting module, detect a first response signal regarding the first magnetic field signal through the first communication module, in response to receipt of the first response signal, search for a first wireless power receiver that transmits and receives wireless power using the first frequency band, transmit the second magnetic field signal through the power transmitting module, detect a second response signal regarding the second magnetic field signal through the second communication module, and, in response to receipt of the second response signal, search for a second wireless power receiver that transmits and receives wireless power using the second frequency band.

In another aspect, there is provided a wireless power transmission method including: transmitting a first magnetic field signal of a first frequency band through a power transmitting module that transmits wireless power by using any one of a magnetic field of the first frequency band and a magnetic field of a second frequency band that is different from the first frequency band; detecting a first response signal regarding the first magnetic signal through the first communication module; in response to receipt of the first response signal, searching for a first wireless power receiver that transmits and receives wireless power using the first frequency band; transmitting a second magnetic signal of the second frequency band through the power transmitting module; detecting a second response signal regarding for the first magnetic field signal through the second communication module; and in response to receipt of the second response signal, searching for a second wireless power receiver that transmits and receives wireless power using the second frequency band.

The solution of the present invention is not limited to said solutions, and the person ordinarily skilled in the art can clearly understand other solutions, which are not mentioned here, by the description and the drawings.

According to the present invention, a single power transmission transmitter may transmit power to a plurality of wireless power receiver using different wireless power transceiving standards.

The effect of the present invention is not limited to said effects, and the person ordinarily skilled in the art can clearly understand other effects, which are not mentioned here, by the description and the drawings.

DESCRIPTION OF EXEMPLARY EMBODIMENTS

Figure 1:
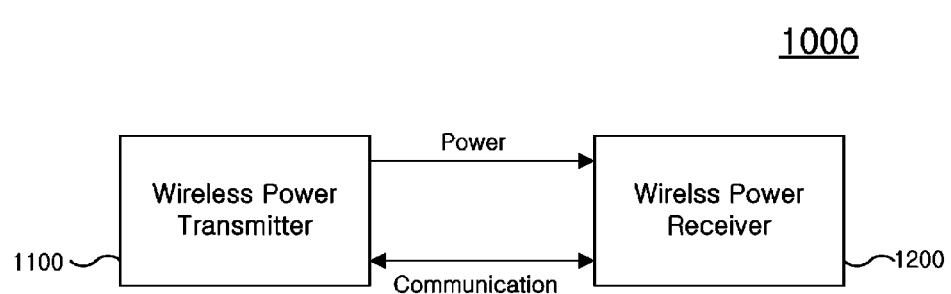
FIG. 1 is a block diagram illustrating a wireless power system according to an exemplary embodiment of the present invention.

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The terms and drawings used in the description is for a comprehensive understanding of the present invention. And the shapes shown in the drawings are presented in exaggerative manner to assist the reader in understanding the present invention. Therefore the present invention is not limited to the terms and drawings used in the description.

If the detailed descriptions of the well-known functions and constructions regarding the present invention can blur the features of the present invention, they may be omitted for increased clarity and conciseness.

In one general aspect, there is provided a wireless power transmitter including: a power transmitting module configured to transmit wireless power using one of a magnetic field of first frequency band and a magnetic field of second frequency band that is different from the first frequency band; a first communication module; a second communication module; and a controller configured to transmit a first magnetic field signal of the first frequency band through the power transmitting module, detect a first response signal regarding the first magnetic field signal through the first communication module, in response to receipt of the first response signal, search for a first wireless power receiver that transmits and receives wireless power using the first frequency band, transmit the second magnetic field signal through the power transmitting module; detect a second response signal regarding the second magnetic field signal through the second communication module, and, in response to receipt of the second response signal, search for a second wireless power receiver that transmits and receives wireless power using the second frequency band.

The first communication module may be an in-band communication module using the magnetic field of the first frequency band, and the second communication module may be an in-band communication module using the magnetic field of the second frequency band.

The first communication module may be an in-band communication module using the magnetic field of the first frequency band, and the second communication module may be an out-band communication module that performs communication using a communication carrier different from the magnetic field.

The second communication module may be a communication module that performs one of Bluetooth, Zigbee, Wi-Fi, Near Field Communication, and Radio Frequency Identification.

The controller may be further configured to: determine that the first wireless power transmitter exists within a wireless power transmission range in the case where the first response signal is received for a first preset time period; determine that the first wireless power transmitter does not exist within the wireless power transmission range in the case where the first response signal is not received for the first preset time period; determine that the second wireless power transmitter exits within a wireless power transmission range in the case where the second response signal is received for a second preset time period; and determine that the second wireless power transmitter does not exist within the wireless power transmission range in the case where the second response signal is not received for the second preset time period.

The controller may be further configured to detect the first response signal for a first preset time period after transmitting the first magnetic field signal, and, if the first present time period has elapsed, transmit the second magnetic field signal.

The controller may be further configured to, in the case where the first wireless power receiver and the second wireless power receiver are found, assign a first identifier (ID) to the first wireless power receiver and a second ID to the second wireless power receiver.

The controller may be further configured to transmit a message including the first ID to the first wireless power receiver through the first communication module and a message including the second ID to the second wireless power receiver through the second communication module.

In another general aspect, there is provided a wireless power transmission method including: transmitting a first magnetic field signal of a first frequency band through a power transmitting module that transmits wireless power by using any one of a magnetic field of the first frequency band and a magnetic field of a second frequency band that is different from the first frequency band; detecting a first response signal regarding the first magnetic signal through the first communication module; in response to receipt of the first response signal, searching for a first wireless power receiver that transmits and receives wireless power using the first frequency band; transmitting a second magnetic signal of the second frequency band through the power transmitting module; detecting a second response signal regarding for the first magnetic field signal through the second communication module; and in response to receipt of the second response signal, searching for a second wireless power receiver that transmits and receives wireless power using the second frequency band.

The first communication module may be an in-band communication module using the magnetic field of the first frequency band, and the second communication module may be an in-band communication module using the magnetic field of the second frequency band.

The first communication module may be an in-band communication module using the magnetic field of the first frequency band, and the second communication module may be an out-band communication module that performs communication using a communication carrier different from the magnetic.

The second communication module may be a communication module that performs one of Bluetooth, Zigbee, Wi-Fi, Near Field Communication (NFC), and Radio Frequency Identification (RFID).

The searching for the first wireless power receiver may include determining that the first wireless power receiver exists in a wireless power transmission range in the case where the first response signal is received for a first preset time period, and determining that the first wireless power receiver does not exist in the wireless power transmission range in the case where the first response signal is not received for the first present time, and the searching for the second wireless power receiver may include determining that the second wireless power receiver exists in a wireless power transmission range in the case where the second response signal is received for a second present time period, and determining that the second wireless power receiver does not exists in the wireless power transmission range in the case where the second response signal is not received for the second preset time period.

The detecting of the first response signal may be performed for a first present time period after transmission of the first magnetic field signal, and the detecting of the second response signal may be performed when a second present time period has lapsed after transmission of the first magnetic field signal.

The wireless power transmission method may further include, in a case where the first wireless power receiver and the second wireless power receiver are found, assigning a first identifier (ID) to the first wireless power receiver and a second ID to the second wireless power receiver.

The wireless power transmission may further include: transmitting a message including the first ID to the first wireless power receiver through the first communication module; and transmitting a message including the second ID to the second wireless power receiver through the second communication module.

Hereinafter, a wireless power system 1000 according to an exemplary embodiment of the present invention is described.

The wireless power system 1000 is enabled to transmit power wirelessly in a magnetic field.

FIG. 1 is a block diagram illustrating the wireless power system 1000 according to an exemplary embodiment of the present invention.

Referring to FIG. 1, the wireless power system 1000 includes a wireless power transmitter 1100 and a wireless power receiver 1200. The wireless power transmitter 1100 creates a magnetic field by being applied with power from an external power source S. The wireless power receiver 1200 receives power wirelessly by generating currents using the created magnetic field.

In addition, in the wireless power system 1000, the wireless power transmitter 1100 and the wireless power receiver 1200 may transmit and receive various kinds of information required for wireless power transmission. Here, communication between the wireless power transmitter 1100 and the wireless power receiver 1200 may be performed according to either in-band communication using a magnetic field used for the wireless power transmission or out-band communication using an additional communication carrier.

Here, the wireless power transmitter 1100 may be a fixed type or a mobile type. Examples of a fixed-type wireless power transmitter 1100 may be in a form of being embedded in a furniture inside, such as a ceil, wall, and a table, being implanted in the outside, such as a parking lot, a bus station, and a subway station, and being installed in a transportation means, such as a vehicle and a train. A mobile-type wireless power transmitter 1100 may be a mobile device, which is light and compact enough to carry, or a component of a different device, such as a cover of a notebook.

In addition, it needs to understand that the wireless power receiver 1200 may include various home appliances that operates by receiving power wirelessly, rather than using an additional electronic device and a power cable. Typical examples of the wireless power receiver 1200 includes a portable terminal, a cellular phone, a smart phone, a Personal Digital Assistant (PDA), a Portable Media Player (PMP), a Wibro terminal, a tablet, a pablet, a notebook, a digital camera, a navigation terminal, a TV, an Electronic Vehicle (EV), and the like.

In the wireless power system 1000, a single wireless power receiver 1200 or a plurality of wireless power receiver 1200 may be provided. FIG. 1 shows an example in which the wireless power transmitter 1100 transmits power only to the wireless power receiver 1200, but a single wireless power transmitter 1100 may transmit power to a plurality of wireless power receiver 1200. In particular, if wireless power transmission is performed using the resonant magnetic coupling scheme, a single wireless power transmitter 1100 is able to transmit power to multiple wireless power receiver 1200 simultaneously using a simultaneous transmission technique or a Time Division Multiple Access (TDMA) transmission technique.

A replay for improving a wireless power transmission distance may be further included in the wireless power system 1000, although being omitted from FIG. 1. A passive-type resonance loop, which is embodied as an LC circuit, may be used as the relay. The resonance loop may focus a magnetic field radiating in the air to improve a wireless power transmission distance. In addition, it is possible to secure much wider wireless power transmission coverage using multiple relays at the same time.

Hereinafter, the wireless power transmitter 1100 according to an exemplary embodiment of the present invention is described.

The wireless power transmitter 1100 is capable of transmitting power wirelessly.

Figure 2:
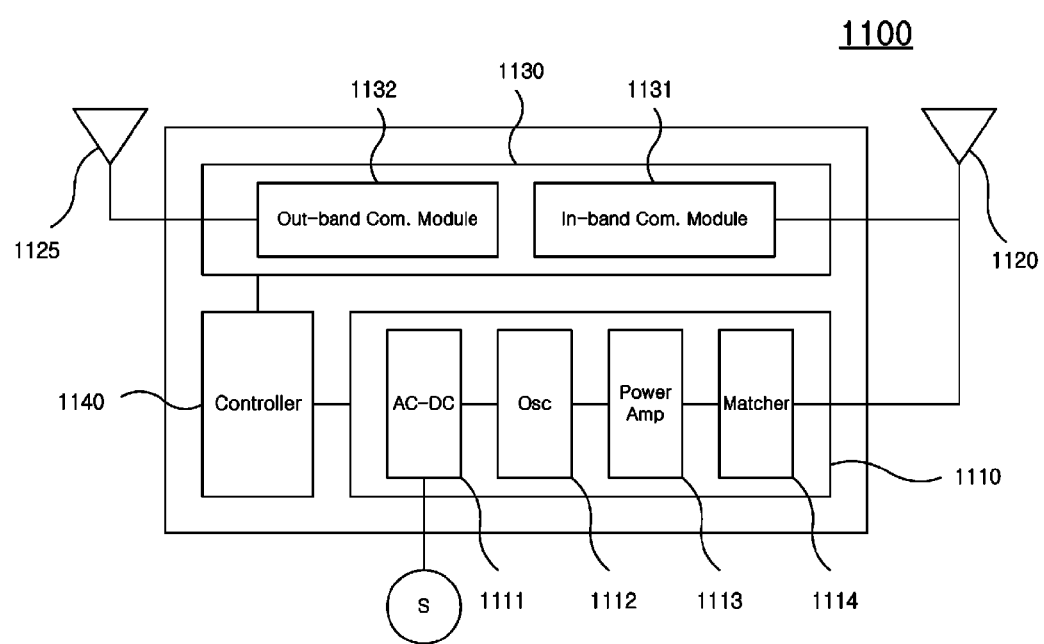
FIG. 2 is a block diagram illustrating a wireless power transmitter according to an exemplary embodiment of the present invention.

FIG. 2 is a block diagram illustrating the wireless power transmitter 1100 according to an exemplary embodiment of the present invention.

Referring to FIG. 2, the wireless power transmitter 1100 includes a power transmitting module 1110, a transmit antenna 1120, a communication module 1130, and a controller 1140.

The power transmitting module 1110 may generate transmission power with power applied from an external power source S. The power transmitting module 1110 may include an AC-DC converter 1111, a frequency oscillator 1112, a power amplifier 1113, and an impedance matcher 1114.

The AC-DC converter 1111 may convert AC power into DC power. The AC-DC converter 1111 receives AC power from the external power source S, converts a waveform of the received AC power into DC power, and outputs the DC power. The AC-DC converter 1111 may adjust a voltage value of DC power to be output.

The frequency oscillator 1112 may convert DC power into AC power of a desired particular frequency. The frequency oscillator 1112 receives DC power output from the AC-DC converter 1111, converts the received DC power into AC power of a particular frequency, and outputs the AC power of particular frequency. The particular frequency may be a resonance frequency. The frequency oscillator 1112 may output AC power of a resonance frequency. Of course, the frequency oscillator 1112 does not necessarily oscillate a resonance frequency.

The power amplifier 1113 may amplify voltage or current of power. The power amplifier 1113 receives AC power of a particular frequency, output from the frequency oscillator 1112, amplifies voltage or current of the received AC power of a particular frequency, and outputs the AC power whose voltage or current is amplified.

The impedance matcher 1114 may perform impedance matching. The impedance matcher 1114 may include a capacitor, an inductor, and a switching device that switches connection between the capacitor and the inductor. Impedance matching may be performed by detecting a reflected wave of wireless power transmitted from the transmit antenna 1120 and then switching the switching device based on the reflected wave to adjust a connection state of the capacitor or inductor, adjust capacitance of the capacitor, or adjust inductance of the inductor.

The transmit antenna 1120 may generate an electromagnetic field by using AC power. The transmit antenna 1120 may be applied with AC power of a particular frequency, which is output from the power amplifier 1113, and accordingly create a magnetic field of the particular frequency. The created magnetic field radiates, and the wireless power receiver 1200 receives the radiating magnetic field to thereby generate current. In other words, the transmit antenna 1120 transmits power wirelessly.

The communication antenna 1125 may transmit and receive a communication signal using a communication carrier other than a magnetic field communication carrier. For example, the communication antenna 1125 may transmit and receive a communication signal, such as a Wi-Fi signal, a Bluetooth signal, a Bluetooth LE signal, a Zigbee signal, an NFC signal, and the like.

The communication module 1130 may receive and transmit information with respect to the wireless power receiver 1200. The communication module 1130 may include an in-band communication module 1131 and an out-band communication module 1132.

The in-band communication module 1131 may transmit and receive information using a magnetic wave of a particular frequency used as a center frequency. For example, the communication module 1130 may perform in-band communication by transmitting information loaded into a magnetic wave through the transmit antenna 1120 or receiving a magnetic wave loaded with information through the transmit antenna 1120. At this point, using a modulation schemes, such as Binary Phase Shift Keying (BPSK) or Amplitude Shift Keying (ASK)) and a coding scheme, such as Manchester or non-return-to-zero level coding, information may be loaded into a magnetic wave or a magnetic wave loaded with information may be interpreted. Using the in-band communication, the communication module 1130 is enabled to transmit and receive information at few kbps within a range of up to few meters.

The out-band communication module 1132 may perform out-band communication through the communication antenna 1125. For example, the communication module 1130 may be a short-range communication module. Examples of the short-range communication module includes a Wi-Fi module, a Bluetooth module, a Bluetooth LE module, a Zigbee module, an NFC module, and the like.

The controller 1140 may control overall operations of the wireless power transmitter 1100. The controller 1140 may compute and process various kinds of information and control each configuration element of the wireless power transmitter 1100.

The controller 1140 may be a computer or a similar device by using hardware, software or a combination thereof. In terms of hardware, the controller 1140 may be an electro circuit that performs a control function by processing an electronic signal. In terms of software, the controller 1140 may be a program that executes a hardware controller 1140.

Hereinafter, the wireless power receiver 1200 according to an exemplary embodiment is described.

The wireless power receiver 1200 is capable of receiving power wirelessly.

Figure 3:
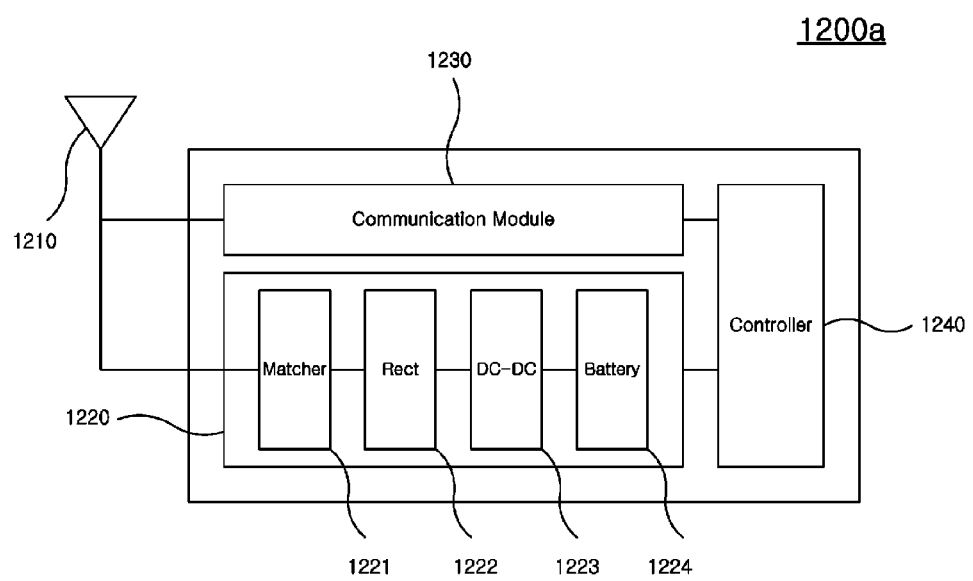
FIG. 3 is a block diagram of the first-type wireless power receiver according to an exemplary embodiment of the present invention.

FIG. 3 is a block diagram illustrating the first-type wireless power receiver 1200 according to an exemplary embodiment of the present invention.

Referring to FIG. 3, the wireless power receiver 1200 includes a receive antenna 1210, a power receiving module 1220, a communication module 1230, and a controller 1240.

The receive antenna 1210 may receive wireless power from the wireless power transmitter 1100. The receive antenna 1210 may receive power using a magnetic field radiating from the transmit antenna 1120. If a particular frequency is a resonance frequency, magnetic resonance occurs between the transmit antenna 1120 and the receive antenna 1210 so that it is possible to receive power more efficiently.

Using power received by the receive antenna 1210, the power receiving module 1220 may charge or drive the wireless power receiver 1200. The power receiving module 1220 may include an impedance matcher 1221, a rectifier 1222, a DC-DC converter 1223, and a battery 1224.

The impedance matcher 1221 may adjust impedance of the wireless power receiver 1200. The impedance matcher 1221 may include a capacitor, an inductor, and a switching device that switches a combination thereof. Impedance matching may be performed by controlling the switching device of the impedance matcher 1221 based on a voltage value, a current value, a power value, a frequency value, etc., of received wireless power.

The rectifier 1222 may rectify received wireless power to convert AC into DC. The rectifier 1222 may AC into DC using a diode or a transistor and smooth DC using a capacitor and a resistance. The rectifier 1222 may be a wave rectifier embodied as a bridge circuit, a half-wave rectifier, a voltage multiplier, and the like.

The DC-DC converter 1223 may output the rectified DC by converting voltage of the rectified DC into a desired level. If a voltage value of DC power rectified by the rectifier 1222 is greater or smaller than a voltage value required for charging a battery or executing an electronic device, the DC-DC converter 1223 may change a voltage value of the rectified DC power into desired voltage.

The battery 1224 may store energy using power output from the DC-DC converter 1223. However, the wireless power receiver 1200 does not necessarily include the battery 1224. For example, a battery may be provided as a detachable external component. In another example, instead of the battery 1224, a driving means for driving various operations of an electronic device may be included in the wireless power receiver 1200.

The communication module 1230 may transmit and receive information with respect to the wireless power receiver 1200. In the first-type wireless power receiver 1200, the communication module 1230 may perform in-band communication.

The communication module 1230 for in-band communication may receive and transmit information using a magnetic wave with a particular frequency used as a center frequency. For example, the communication module 1230 may perform in-band communication by transmitting information loaded into a magnetic wave through the receive antenna 1210 or receiving a magnetic wave loaded with information through the receive antenna 1210. At this point, using a modulation scheme, such as BPSK or ASK, and a coding scheme, such as Manchester coding or NZR-L coding, it is possible to load information into the magnetic field or interpret a magnetic wave loaded with information. Using the in-band communication, the communication module 1230 may be able to receive and transmit information at a few kbps within up to a few meters.

The controller 1240 may control overall operations of the wireless power receiver 1200. The controller 1240 may compute and process various kinds of information and control each configuration element of the wireless power receiver 1200.

The controller 1240 may be a computer or a similar device by using hardware, software, or a combination thereof. In terms of hardware, the controller 1240 may be an electronic circuit that performs a controlling function by processing an electronic signal. In terms of software, the controller 1240 may be a program that drives the hardware controller 1240.

Figure 4:
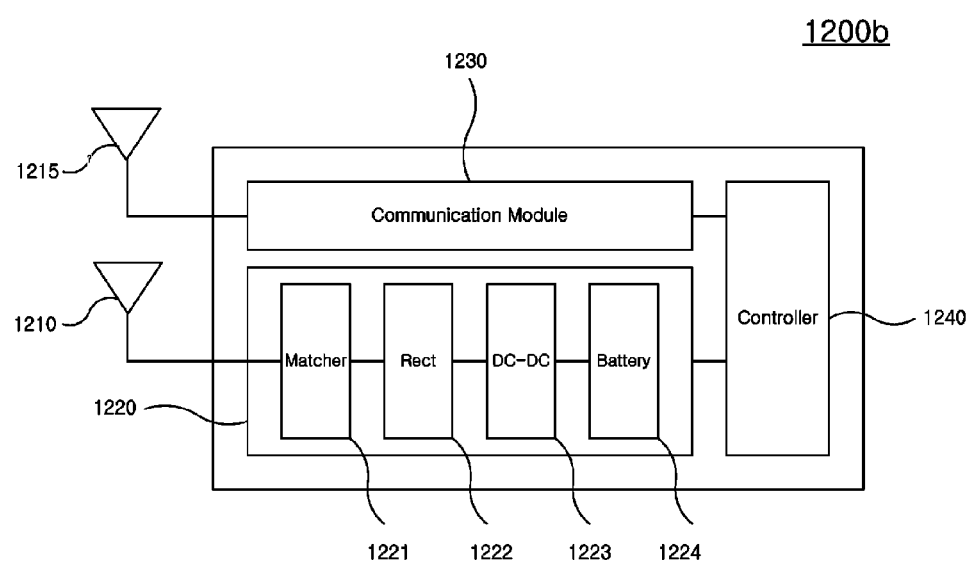
FIG. 4 is a block diagram illustrating the second-type wireless power receiver according to an exemplary embodiment of the present invention.

FIG. 4 is a block diagram illustrating the second-type wireless power receiver 1200 according to an exemplary embodiment.

Referring to FIG. 4, the second-type wireless power receiver 1200 may further include a communication antenna 1215 in addition to the configuration of the first-type wireless power receiver 1200. The communication module 1230 in the second-type wireless power receiver 1200 may be an out-band communication module.

The communication antenna 1215 may receive and transmit a communication signal using a communication carrier other than a magnetic field communication carrier. For example, the communication antenna 1215 may receive and transmit a communication signal, such as a Wi-Fi signal, a Bluetooth signal, a Bluetooth LE signal, a Zigbee signal, an NFC signal, and the like.

An out-band communication module, the communication module 1230 may perform an out-band communication through the communication antenna 1215. For example, the communication module 1130 may be provided as a short-range communication module. Examples of the short-range communication module include a Wi-Fi communication module, a Bluetooth communication module, a Bluetooth LE communication module, a Zigbee communication module, an NFC communication module, and the like.

Accordingly, in the second-type wireless power receiver 1200, wireless power may be received through the receive antenna 1210, while communication with the wireless power transmitter 1100 may be performed through the communication antenna 1215.

Hereinafter, there are provided descriptions about a procedure in which power is transmitted wirelessly in the wireless power system 1000 according to an exemplary embodiment of the present invention.

Wireless transmission of power may be performed using the inductive coupling scheme or the resonant magnetic coupling scheme. The wireless transmission of power may be performed between the transmit antenna 1120 of the wireless power transmitter 1100 and the receive antenna 1210 of the wireless power receiver 1200.

In the case of using the resonant magnetic coupling scheme, the transmit antenna 1120 and the receive antenna 1210 may be in a form of a resonance antenna. A resonance antenna may be in a resonance structure that includes a coil and a capacitor. A resonance frequency of the resonance antenna is decided by inductance of the coil and capacitance of the capacitor. The coil may be in a loop form. In addition, a core may be disposed inside the loop. The core may include a physical core, such as a ferrite core, or an air core.

Energy transmission between the transmit antenna 1120 and the receive antenna 1210 may be possible using resonance of a magnetic field. The resonance refers to a case where, if a near field corresponding to a resonant frequency occurs in one resonance antenna and another resonance antenna is located nearby, the two resonance antenna are coupled so that highly efficient energy transfer occurs between the resonance antennas. If a magnetic field corresponding to a resonance frequency is created between a resonance antenna of the transmit antenna 1120 and a resonance antenna of the receive antenna 1210, a resonance phenomenon where the two resonance antennas causes resonance occurs, a magnetic field toward the receive antenna 1210 is focused more efficiently than when a magnetic field created in the transmit antenna 1120 radiates into a free space, and, in turn, energy may be transmitted more efficiently from the transmit antenna 1120 to the receive antenna 1210.

The inductive coupling scheme may be embodied similarly as the resonance magnetic coupling scheme does. However, a frequency of the magnetic field does not necessarily be a resonance frequency. Instead, in the inductive coupling scheme, loops of the receive antenna 1210 and the transmit antenna 1120 are required to be matched and a gap between the loops needs to be very close.

Hereinafter, there are provided descriptions about a wireless power network according to an exemplary embodiment of the present invention.

A wireless power network 2000 may indicates a network that performs wireless power transmission and communication.

Figure 5:
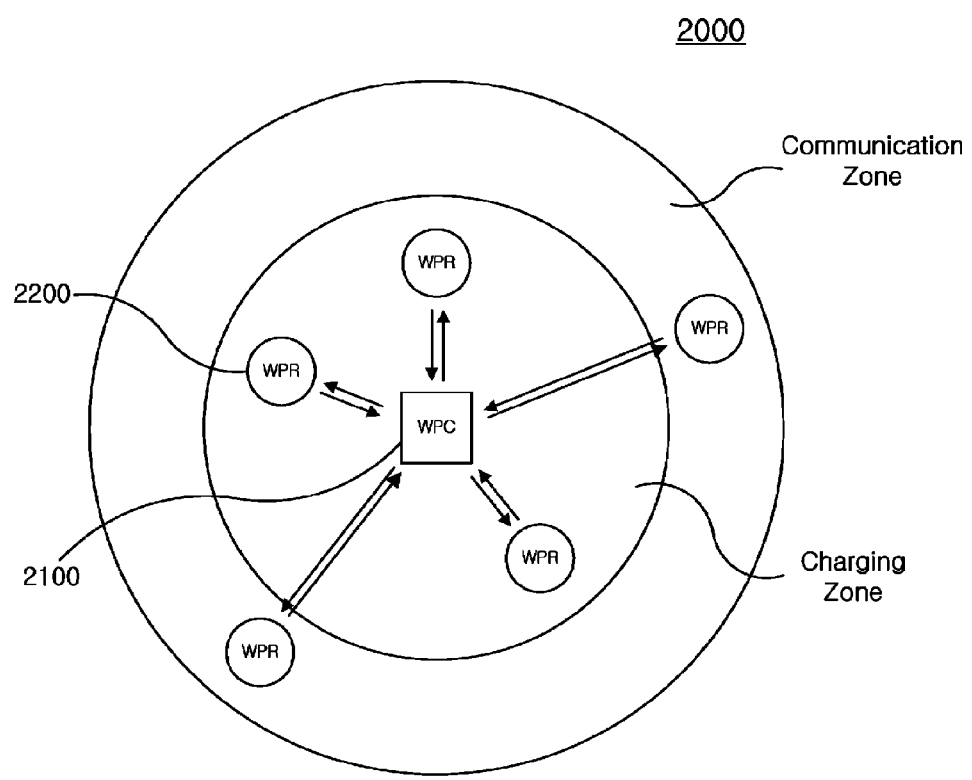
FIG. 5 is a schematic diagram illustrating communication in a wireless power network according to an exemplary embodiment of the present invention.
Figure 6:
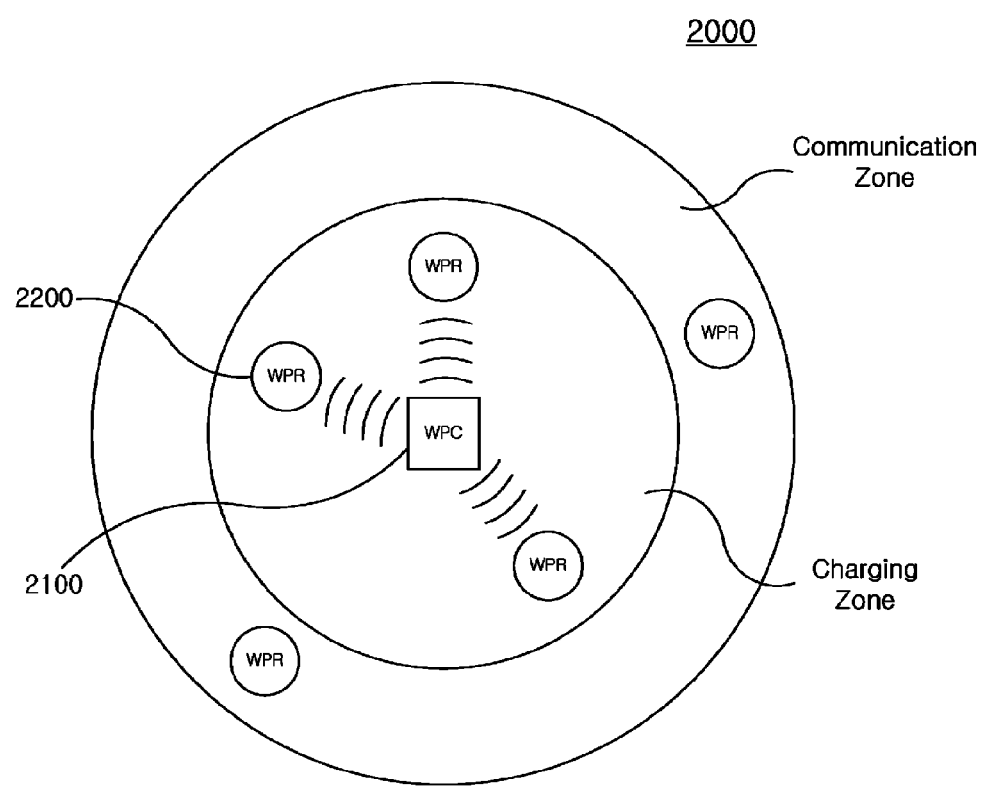
FIG. 6 is a schematic diagram illustrating wireless power transmission in a wireless power network according to an exemplary embodiment of the present invention.

FIG. 5 is a schematic diagram illustrating communication on the wireless power network 2000 according to an exemplary embodiment of the present invention, and FIG. 6 is a schematic diagram illustrating wireless power transmission on the wireless power network 2000 according to an exemplary embodiment of the present invention.

Referring to FIGS. 5 and 6, a wireless power network 2000 may include a Wireless power Charger (WPC) 2100 and a Wireless Power Receiver (WRP) 2200. The WPC 2100 may be the aforementioned wireless power transmitter 1100 or a device that performs functions identical or similar to those of the wireless power transmitter 1100. In addition, the WPR 2200 may be the aforementioned wireless power receiver 1200 or a device that performs functions identical or similar to those of the wireless power receiver 1200.

Therefore, operations to be performed by the WPC 2100 may be performed constituent elements of the wireless power transmitter 1100, and operations to be performed by the WPR 2200 may be performed by constituent elements of the wireless power receiver 1200. For example, communication between the WPC 2100 and the WPR 2200 may be performed by the communication modules 1131 and 1230 in an in-band communication through the receive antenna 1210, or may be performed by the communication modules 1132 and 1230 in an out-band communication through the communication antenna 1125 and 1251. In addition, transmission and receipt of wireless power may be performed by the power transmitting module 1110 and the power receiving module 1220 using the resonant magnetic coupling scheme or the inductive coupling scheme through the transmit antenna 1120 and the receive antenna 1210. Similarly, the following operations of selecting a power transmission mode, assigning a time slot, controlling the WPR 2200 to be activated or inactivated, and any other controlling and computation may be performed by the controllers 1140 and 1240.

The wireless power network 2000 may be provided in a form of start topology where one or more WPR 2200 are arranged centering on a single WPC 2100. The WPC 2100 may radiate a magnetic field. Accordingly, a communication zone and a charging zone may be formed centering on the WPC 2100.

The communication zone refers to an area where the WPC 2100 is capable of communicating with the WPR 2200, and the charging area refers to an area where the WPR 2200 is capable of charging the battery or operating itself by using a magnetic field received from the WPC 2100.

The communication area may include the charging area. For example, in the case where in-band communication is performed in the wireless power network 2000, the communication area may be a range where communication packets is able to be transmitted to and received from the WPR 2200 due to a magnetic field radiated by the WPC 2100. The further a transmission distance is, the less amount of power the magnetic field radiated by the WPC 2100 transfers. In addition, the power transferred by the magnetic field needs to be greater than a predetermined level to charge or drive the WPR 2200. However, magnetic field communication does not have such constraints or limitations, so that a charging area is formed smaller than a communication area. Of course, the size of the communication area may be the same as that of the charging area. Meanwhile, in the case where out-band communication is performed, a range of a short-range communication network is larger than a wireless power transmission range, so that a communication area may be formed larger than a charging area.

Whether the WPR 2200 belong to a charging area or a communication area except for the charging area may be determined by whether the WPR 2200 is properly charged (or driven). For example, based on a level of a magnetic field received from the WPR 2200, the WPC 2100 may determine whether the WPR 2200 is able to be properly charged. Alternatively, based on a level of a magnetic field radiated by the WPC 2100, the WPR 2200 may determine whether charging can be done properly, and transmit a result of the determination to the WPC 2100.

Again, referring to FIG. 5, the WPC 2100 may exchange information by transmitting and receiving magnetic field signals or communication carriers according to out-band communication with respect to the WPR 2200 existing in a communication area that includes a charging area. In addition, referring to FIG. 6, using a magnetic field, the WPC 2100 may transmit wireless power to a specific WPR 2200 existing in a charging area among WPRs 2200.

Although FIGS. 5 and 6 illustrates examples in which a charging area and a communication area forms circles, respectively, and are spatially distinguishable from each other, but the charging area and the communication area may have a different shapes according to characteristics of the WPR 2200. For example, a WPR 2200 with low charging voltage may have a larger charging area than a WPR 2200 with high charging voltage.

Hereinafter, a wireless power transceiving method according to an exemplary embodiment of the present invention is described. The wireless power transceiving method is described using the aforementioned wireless power network 2000. However, the wireless power transceiving method is not limited thereto, and may be performed a system identical or similar to the wireless power network 2000.

Figure 7:
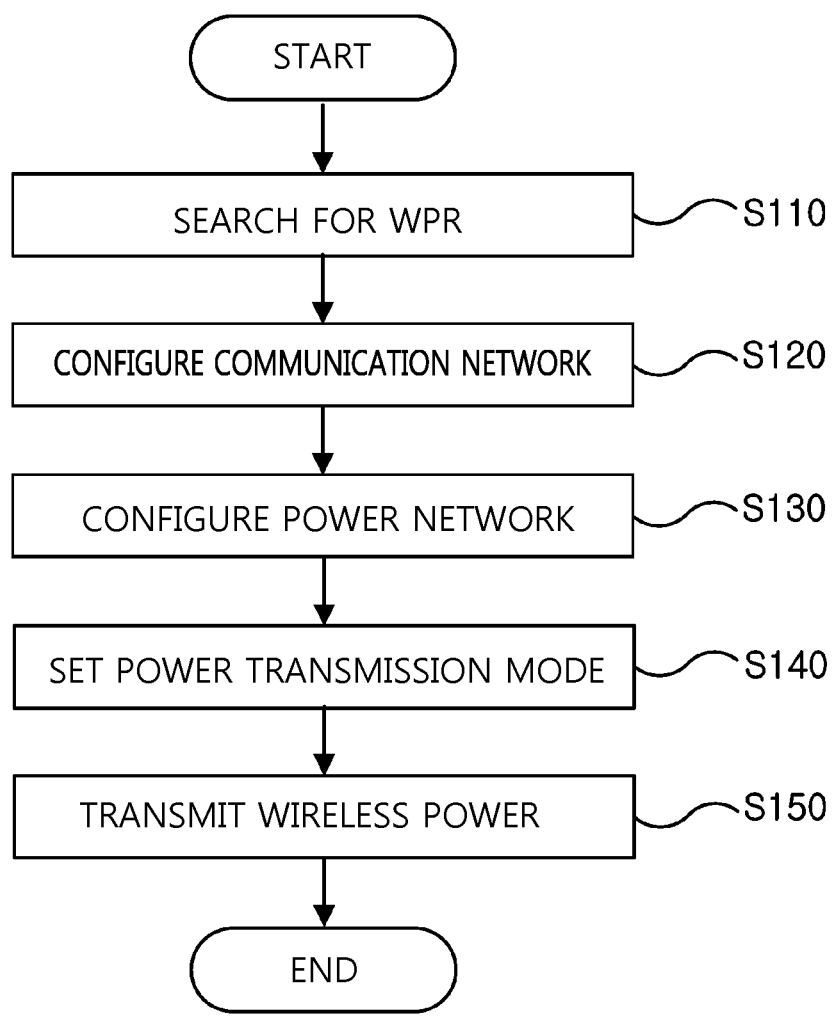
FIG. 7 is a flowchart illustrating a method for transmitting and receiving wireless power according to an exemplary embodiment of the present invention.

FIG. 7 is a flowchart illustrating a wireless power transceiving method according to an exemplary embodiment of the present invention.

Referring to FIG. 7, the wireless power transceiving method includes an operation S110 of searching for a WPR 2200, an operation S120 of setting a communication network, an operation S130 of setting a power network, an operation S140 of setting a power transmission mode, and an operation S150 of transceiving wireless power. Hereinafter, there are provided detailed descriptions about each of the aforementioned operations.

First of all, a WPC 2100 searches for a neighboring WPR 2200 in S110.

The WPR 2200 may transmit and receive wireless power according to various wireless power transmitting and receiving protocols. For example, the WPR 2200 may operate according to a wireless power transmitting and receiving protocol or a communication protocol, which is defined in at least one of Qi standard of the Wireless Power Consortium, a wireless power transceiving standard of Alliance For Wirless Power (A4WP), a wireless power transciving standard of Power Matteres Alliance (PMA), a wireless power transceiving standard led by Near Field Communication (NFC) or Radio Frequency Identification (RFID), ISO/IEC SC6, ISO TC100, CJK wireless power transmission standard, other various domestic standards, international standards, and industrial standards.

The WPC 2100 may perform communication and power transmission and receipt according to a method defined by a plurality of standards among the aforementioned various standards. Accordingly, the WPC 2100 may search for a WPR 2200 according to a different standard.

The WPC 2100 may periodically broadcast a scanning signal according to a plurality of standards. For the scanning signal, various communication carriers of various frequency bands may be used. For example, in the case of Qi standard, a magnetic field signal of a specific frequency band is transmitted to search for a nearby WPR 2200. In another example, in the case of A4WP standard, a magnetic field signal of a different frequency band is transmitted to search for a nearby WPR 2200.

Each of the WPRs 2200 transmits a response signal to the WPC 2100 in response to a scanning signal according to a standard applied to a corresponding WPR 2200. The WPC 2100 analyzes the response signal to determine whether there is a nearby WPR 2200 to which a specific standard is applied.

Figure 8:
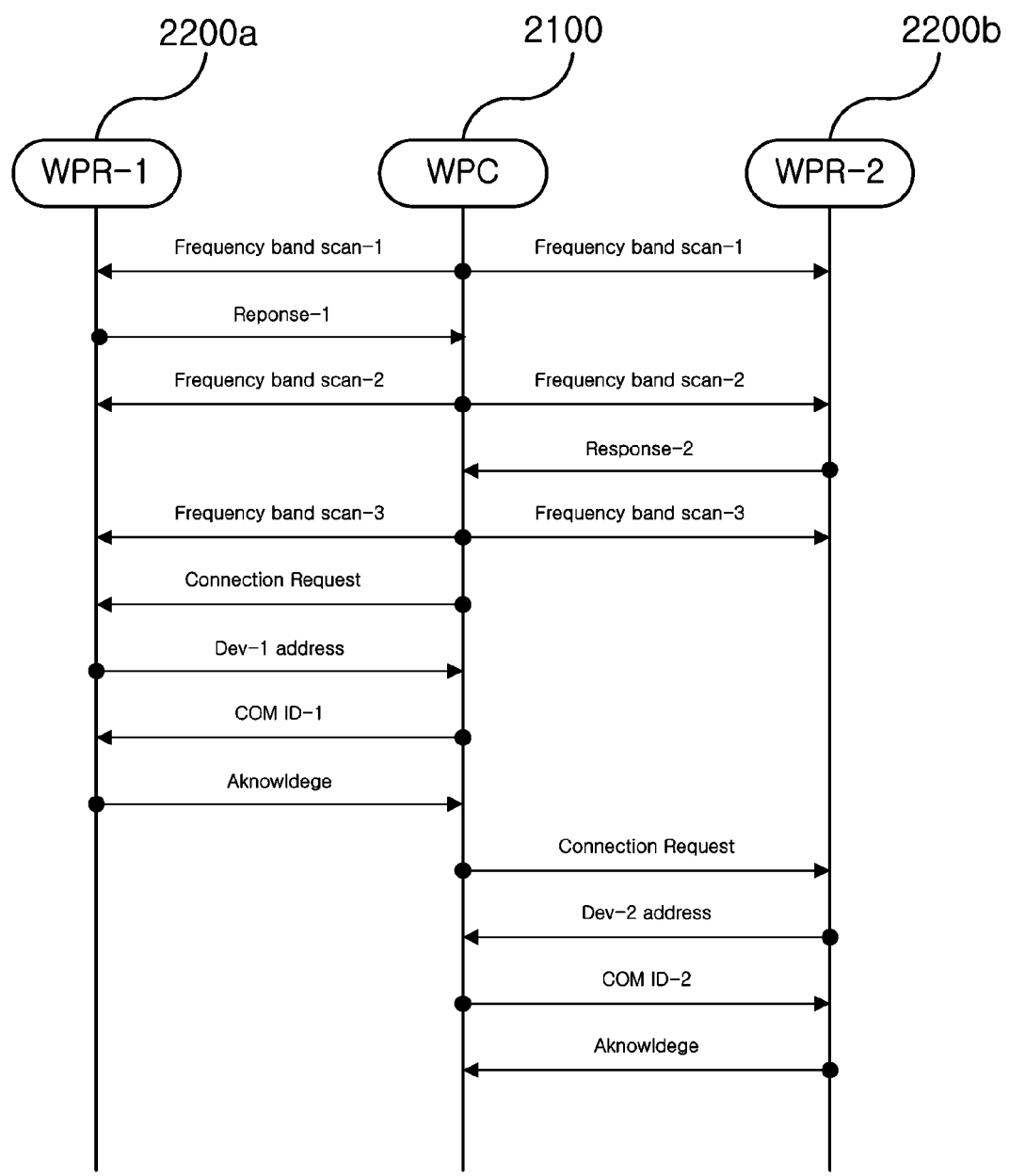
FIG. 8 is a detailed flowchart illustrating an operation of configuring a communication network in a method for transmitting and receiving wireless power according to an exemplary embodiment of the present invention.

A method for searching for the WPR 2200 is described in detail with reference to FIG. 8. FIG. 8 is a detailed flowchart illustrating an operation of configuring a communication network in a wireless power transceiving method according to an exemplary embodiment of the present invention.

The WPC 2100 is a device that transmits and receives wireless power according to the first, second, and third standards. The first WPR (WPR-1) 200a is a device that complies with the first standard for wireless power transmission and receipt, and the second WPC (WPR-2) 2200b is a device that complies with the second standard for wireless power transmission and receipt.

Referring to FIG. 8, the WPC 2100 may sequentially broadcast the first scanning signal according to the first standard, the second scanning signal according to the second standard, and the third scanning signal according to the third standard. The first, second, and third scanning signals are signals defined by different standards, and may be different in at least one of a frequency band or a communication carrier. For example, the first scanning signal may be a magnetic signal of 100~200 KHz, the second scanning signal may be a magnetic signal of 6.78 Mhz, and the third scanning signal may be an Radio Frequency Identification (RFID) signal.

The WPC 2100 may transmit each scanning signal and receive a response signal according to a corresponding standard for a predetermined time period. In this case, in response to the first scanning signal, the first WPR 2200a transmit the first response signal according to the first standard. Similarly, in response to the second scanning signal, the second WPR 2200b transmits the second response signal according to the second standard. The first WPR 2200a and the second WPR 2200b do not transmit a response signal in response to the third scanning signal according to the third standard. The first response signal has a frequency band and a communication carrier according to the first standard, while the second response signal has a frequency band and a communication carrier according to the second standard.

In response to receipt of the first response signal the WPC 2100 determines that the first WPR 2200a according to the first standard exists nearby. In addition, in response to receipt of the second response signal, the WPC 2100 determines that the second WPR 2200b according to the second standard exists nearby. Based on each response signal, the WPC 2100 may determine a standard that is applied to a nearby WPR 2200.

Through the aforementioned operation, the WPC 2100 may search for a neighboring WPR 2000.

The above descriptions are about an example where in response to receipt of an response signal, the WPC 2100 determines that the WPR 2200 exists; however, when transmitting a scanning signal, the WPC 2100 detects a reflective wave or a change in impedance so as to determine whether the WPR 2000 exists or determine which standard is applied to the WPR 2000. In this case, a magnetic field is used as a carrier of the scanning signal, and an operation of receiving a response signal may be omitted.

The WPC 2100 may set a communication network in S120. Specifically, the WPC 2100 may include the found WPR 2200 in a communication network.

The WPC 2100 may transmit access request messages to the found WPR 2200. In this case, the access request messages may be signals according to a standard that is determined to be used by the WPR 2200 when the WPR 2200 are detected. In response to an access request signal, a WPR 2200 may transmit an access response message including identification information (i.e., a device address such as MAC address) of the WPR 2200 to the WPC 2100. The access response message may be a signal defined by a standard which is applied to the WPR 2200, and, specifically, an in-band communication signal or an out-band communication signal having a frequency band according to the standard which is applied to the WPR 2200.

Based on the response signal, the WPC may assign a communication identifier (ID) (COM) to the WPR 2200, and transmit a communication network setting message including the communication ID to the WPR 2200. Based on the communication ID included in the communication network setting message, the WPR 2200 may recognize its own identification and transmit an ACK message to the WPC 2100.

A method for setting a communication network is described in detail with reference to FIG. 8.

Referring to FIG. 8, the WPC 2100 transmits the first access request message to the first WPR 200a. In response to the first access message, the first WPR 2200a may transmit the first access response message including identification information of its own to the WPC 2100. Based on the identification information, the WPR 2100 assigns the first communication ID (COM-1) to the first WPR 2200a, and transmit a communication network setting message including the first communication ID (COM-1) to the first WPR 2200a. The first WPR 2200a sets its own communication ID as the first communication ID (COM-1), and transmits an ACK message to the WPC 2100.

Upon completion of setting the communication ID of the first WPR 2200a, the WPC 2100 transmits the second access message to the second WPR 2200b. In response to the second access message, the second WPR 2200b transmits the second response message including identification information of its own to the WPC 2100. Based on the identification information, the WPC 2100 assigns the second communication ID (COM-2) to the second WPR 2200b, and transmits a communication network setting message including the second communication ID (COM-2) to the second WPR 2200b. The second WPR 2200b sets its own communication ID as the second communication ID (COM-2), and transmits an ACK message to the WPC 2100.

In this case, a message used for setting a communication network may be in a message format defined by a standard that is used by a WPR 2200 corresponding to the message. As the WPC 2100 is able to determine which standard is used by each WPR 2200 in the searching operation, the WPC 2100 may determine, based on the determined standard, a format of a message transmitted and received with respect to each WPR 2200.

That is, the first access request message and the first access response message may be provided as a signal with a frequency band and a carrier according to the first standard, and the second access request message and the second access response message may be provided as a signal with a frequency band and a carrier according to the second standard. Thus, the first access request message and the first access response message may be different in at least one of a frequency band, a communication scheme (in-band or out-band), and a communication carrier from the second access request message and the second access response message.

In addition, similarly, the communication network setting message and the ACK message transmitted and received between the WPC 2100 and the first WPR 2200a may be different in at least one of a frequency band, a communication scheme, and a communication carrier from the communication network setting message and the ACK message transmitted and received between the WPC 2100 and the second WPR 2200b.

Accordingly, a communication ID may be assigned to the WPR 2200, thereby setting a communication network. Upon completion of setting the communication network, the WPC 2100 may communicate with the WPR 2200 using a communication ID assigned to the WPR 2200.

Upon completion of setting the communication network, the WPC 2100 may set a power network in S130.

The WPC 2100 may transmit a device profile request message to the WPR 2200. In response to the device profile request message, the WPR 2200 may transmit a device provide response message including a device profile to the WPC 2100. The device profile may include information on a standard used by the WPR 2200 for transmitting and receiving wireless power, information on a standard used for communication, a type of power transmission mode that is supported (a simultaneous mode, a TDMA mode, and a TDMA simultaneous mode that is a combination of the simultaneous mode and the TDMA mode), a type of the WPR 2200 (i.e., a feature phone, a smart phone, and a tablet), a power value (voltage or current) for battery charge, a battery charged state (a completely discharged state, a completely charged state, a percentage of battery charge, etc.), and the like.

Based on the device profile, the WPC 2100 may determine whether a wireless power transmission scheme supported by the WPC 2100 is compatible with a wireless power transmission scheme applied to the WPR 2100. For example, in the case where the WPC 2100 supports wireless power transmission according to Q1 standard and A4WP standard, if the WPR 2200 is capable of receiving wireless power according to one of the two standards, the WPC 2100 may determine that the WPR 2200 is compatible therewith. Alternatively, in the case where the WPC 2100 supports wireless power transmission according to Q1 standard and A4WP standard, if the WPR 2200 receives wireless power according to PMA standard, the WPC 2100 may determine that the WPR 2200 is not compatible therewith.

In the case where the WPR 2200 is compatible, the WPC 2100 assigns a power ID (WPT-ID) to the WPR 2200, and transmits a power network setting message including the power ID to the WPR 2200. Based on the received power network setting message, the WPR 2200 may recognize its own power ID and transmit an ACK message to the WPC 2100.

In the case where the WPR 2200 is not compatible, the WPC 2100 may transmit, to the WPR 2200, a message indicating incompatibility, and then, the WPR 2200 may transmit an ACK message to the WPC 2100, Being incompatible with the WPC 2100, the WPR 2200 may not receive power in next operation S140 of transmitting power.

Figure 9:
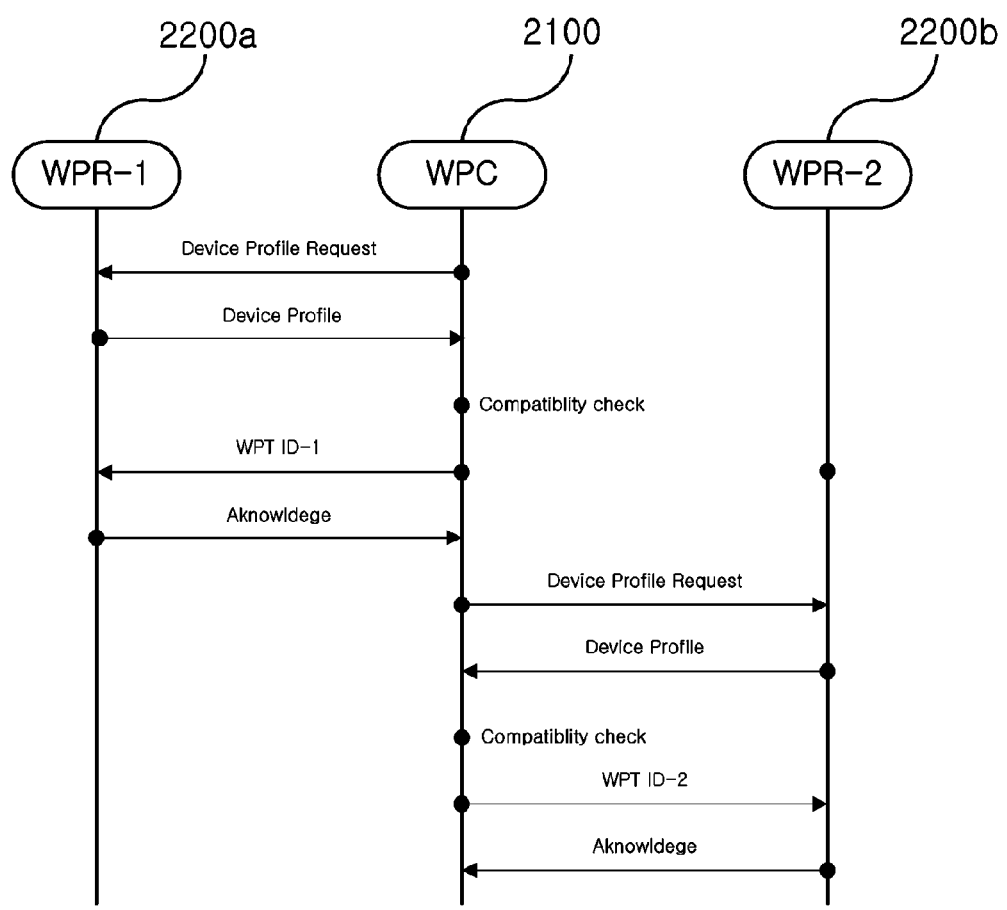
FIG. 9 is a detailed flowchart illustrating an operation of configuring a charging network in a method for transmitting and receiving wireless power according to an exemplary embodiment of the present invention.

A method of setting a power network is described in detail with reference to FIG. 9. FIG. 9 is a detailed flowchart illustrating an operation of constructing a charging network in the wireless power transceiving method according to an exemplary embodiment of the present invention.

Referring to FIG. 9, the WPC 2100 transmits the first device profile request message to the first WPR 2200a. In response, the first WPR 2200a may transmit a first device profile response message including its own device profile to the WPC 2100. Based on the device profile of the first WPR 2200a, the WPC 2100 may determine whether the first WPR 2200a is compatible therewith by determining whether the wireless power transmission standard used by the first WPR 2200a corresponds to a standard supported by the WPC 2100. In the case where the first WPR 2200a is compatible with the WPC 2100, the WPC 2100 may assign the first power ID (SPT ID-1) to the first WPR 2200a, and transmit a message including the first power ID to the first WPR 2200a. In response to receipt of the message, the first WPR 2200a may set its own power ID as the first power ID (WPT ID-1), and transmit an ACK message to the WPC 2100.

Upon completion of setting of the power ID of the first WPR 2200a, the WPC 2100 transmit the second device profile request message to the second WPR 2200b. In response, the second WPR 2200b may transmit the second device response message including its own device profile to the WPC 2100. By reference to the device profile of the second WPR 2200b, the WPC 2100 determines whether the second WPR 2200b is compatible therewith. In the case where the second WPR 2200b is compatible, the WPC 2100 may assigns the second power ID (WPT ID-2) to the second WPR 2200b, and transmits a message including the second power ID to the second WRP 2200b. In response to receipt of the message, the second WPR 2200b may set its own power ID as the second power ID (WPT ID-2), and transmit an ACK message to the WPC 2100.

The message used for setting a power network may be in a format defined by a standard that is used by a WPR 2200 corresponding to the message. As the WPC 2100 is able to determine which standard is used by each WPR 2200 in the searching operation, the WPC 2100 may determine, based on the determined standard, a format of a message to be transmitted and received.

For example, the first device profile message may be provided as a signal with a frequency band and a carrier according to the first standard, and the second device profile message may be provided as a signal with a frequency band and a carrier according to the second standard. The same manner is used when it comes to a different message used in operation S130.

Accordingly, a power network may bet set in a manner in which, after compatibility/incompatibility of each WPR 2200 is determined, a power ID is assigns based on the result.

Meanwhile, in operation S130, by using a preset communication ID in a header of a message between the WPC 2100 and the WPRs 2200, it is possible to determine which WPR 2200 the message is transmitted and received. For example, the communication ID (COM-1) of the first WPR 2200a is included in a header of the first device profile request message, and the first WPR 2200 among the WPRs 2200 may determine whether the corresponding message is transmitted thereto or not.

Upon completion of setting a power network, the WPC 2100 may set a power transmission mode in S140.

The WPC 2100 may set a power transmission mode. The power transmission mode may include a single mode and a multi-mode. The multi-mode may include a simultaneous mode, a TDMA mode, and a TDMA simultaneous mode that is a combination of the simultaneous mode and the TDMA mode.

For example, the WPC 2100 may select a power transmission mode by considering not only the number of WPRs 2200 to which power IDs are assigned and a power transmission mode supported by the WPRs 2200, but also a standard used by the WPRs 2200 and information included in a device profile of each of the WPRs 2200.

In the case where there is a single WPR 200 in the power network, a single mode may be selected as the power transmission mode. Alternatively, in the case where there is a plurality of WPRs 2200, a multi-mode may be selected as the power transmission mode.

In the case where a plurality of WPRs 2200 in the power network use different power transceiving standards, In the multi-mode, a TDMA mode in the multi-mode may be selected. TDMA is a method in which a power transmission sections are divided into a plurality of time slots, each of the WPRs 2200 is assigned to a time slot, and power is transmitted to the WPR 2200 for a time slot assigned to the WPR 2200 while power supply is blocked to other WPRs 2200 by cutting connection between the receive antenna 1210 and the power receiving module 1220 or clocking the receive antenna 1210.

In the case where there are a plurality of WPRs 2200 complying with different standards, the WPRs 2200 use different frequency bands for a magnetic field and a power transmission interval is time-divided according to standards, so that wireless power may be transmitted and received according to one standard during one time slot, while wireless power may be transmitted and received according to the other standard during the other time slot. Thus, in this case, the TDMA mode may be selected. Meanwhile, in the case where there are a plurality of WPRs 2200 using a specific standard, a time slot assigned to the specific standard is divided into sub time slots so as to enable each of the WPRs 2200 to receive power during a corresponding assigned sub time slot. Alternatively, in the case where there are a plurality of WPRs 2200 using a specific standard, a plurality of WPRs 2200 using a specific standard may be charged simultaneously for the time slot assigned to the specific standard.

Meanwhile, in the case where all the WPRs 2200 in the power network comply with the same standard, any one of the TDMA mode or the simultaneous mode may be variably selected as a power transmission mode. If the standard supports only one of the TDMA mode or the simultaneous mode, a power transmission mode may be selected as the mode supported by the standard.

As such, the WPC 2100 may select the power transmission mode according to the number of WPRs 2200 in the power network or the number of standards used by the WPRs 2200. However, there is a mode not supported by the WPRs 2200, the WPC 2100 should not select the mode.

Upon completion of setting a power transmission mode, wireless power may be transmitted and received according to the selected mode in S150.

The WPC 2100 may transmit a wireless power transmission request message to the WPRs 2200. In response, each of the WPRs 2200 may transmit a wireless power transmission response message. For a starter, based on the wireless power transmission request message or the wireless power transmission response message, the WPC 2100 calculates electric power, voltage, and current to be transmitted to a corresponding WPR 2200.

Then, the WPC 2100 may transmit a message including information on a power transmission mode to the corresponding WPR 2200. The message may include information on which power transmission mode is used to perform power transmission, information on time slot division for a power transmission interval with respect to the TWDM mode, and information on a WPR 2200 assigned with each time slot. In response to receipt of the message, each of the WPRs 2200 may determine a power transmission mode and, if a power transmission interval is time-divided, identify which time slot is assigned. Accordingly, each of the WPR 2200 may be activated for a time slot assigned thereto, but inactivated for time slots not assigned thereto.

Then, the WPC 2100 may transmit test power. In response to receipt of the test power, a corresponding WPR 2200 may transmit a device status message including power, voltage, and current received by the test power to the WPC 2100. Based on the device status message, the WPC 2100 adjusts power to be transmitted, such as performing impedance matching and adjusting an amplification ratio. Then, the WPC 2100 transmits the adjusted power to the WPR 2200. During power transmission, the WPR 2200 may periodically transmit, to the WPC 2100, a power value, a voltage value, and a current value regarding to the received power. By reflecting the values transmitted from the WPR 2200, the WPC 2100 may adjust power to be transmitted.

Finally, upon completion of power transmission, the WPC 2100 transmits, to the WPR 2200, a message notifying the end of power transmission, and finishes transmitting power.

Figure 10:
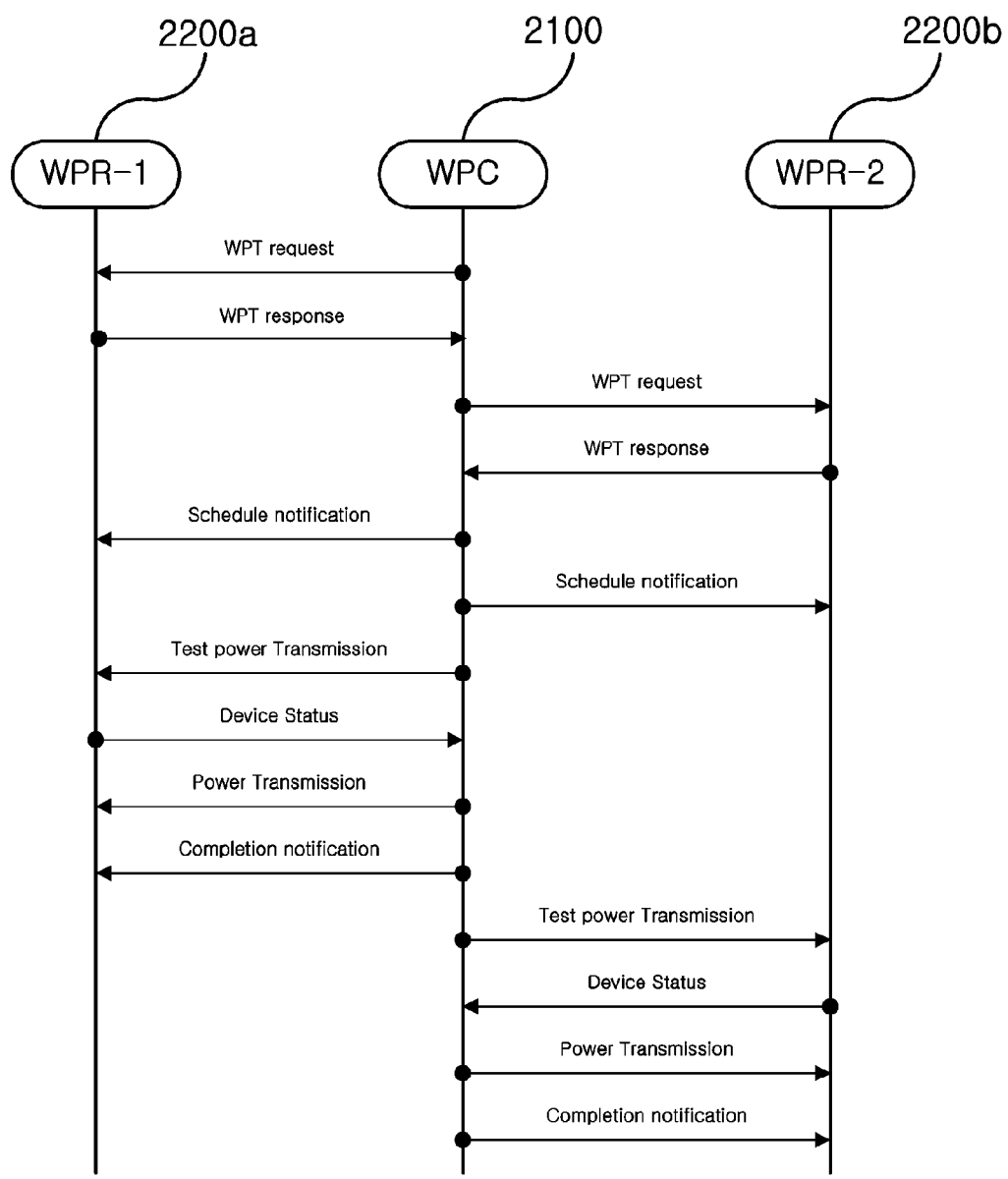
FIG. 10 is a detailed flowchart illustrating an operation of transmitting and receiving power in a method for transmitting and receiving wireless power according to an exemplary embodiment of the present invention.
Figure 11:
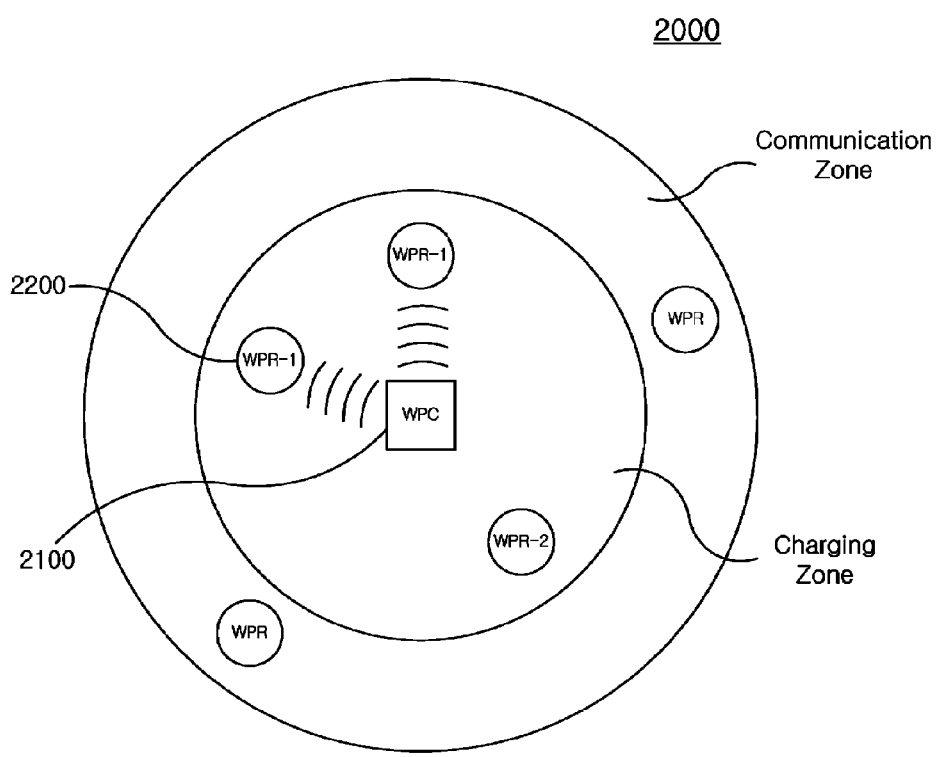
FIGS. 11 and 12 are diagrams illustrating how a wireless power network operates to transmit and receive power in a method for transmitting and receiving wireless power according to an exemplary embodiment.
Figure 12:
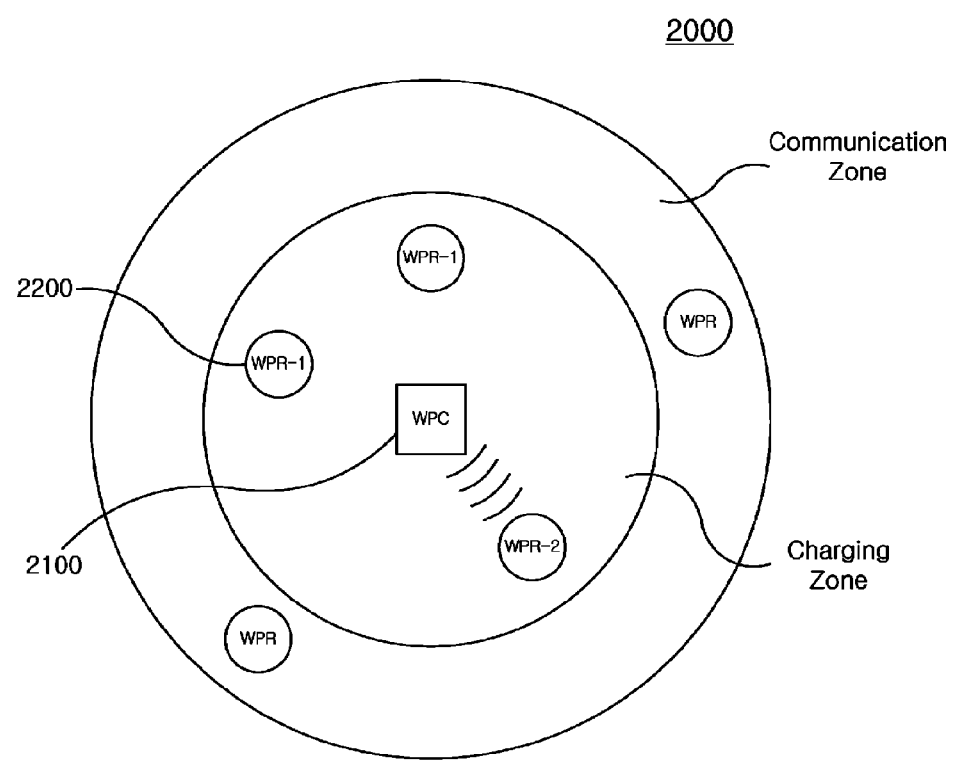

A method for transmitting power is described in detail with reference to FIGS. 10 to 12. FIG. 10 is a detailed flowchart illustrating a power transmitting and receiving operation in the wireless power transceiving method according to an exemplary embodiment of the present invention, and FIGS. 11 and 12 are diagrams illustrating how a wireless power network operates to transmit and receive power in a method for transmitting and receiving wireless power according to an exemplary embodiment.

Referring to FIG. 10, the WPC 2100 may transmit the first power transmission request message to the first WPR 2200a. In response, the first WPR 2200a may transmit the first power transmission response message to the WPC 2100. Based on the first power transmission response message, the WPC 2100 may adjust power to be transmitted to the first WPR 2200a. In addition, the WPC 2100 may transmit the second power transmission request message to the second WPR 2200b. In response, the second WPR 2200b may transmit the second power transmission response message to the WPC 2100. Based on the second power transmission response message, the WPC 2100 may adjust power to be transmitted to the second WPR 2200b.

Then, the WPC 2100 transmits, to the first WPR 2200a, a message including information on a power transmission mode and scheduling information. The scheduling information may be included in the case when a TDMA mode is selected. The scheduling information may include information on time slot division, and information that indicates a time slot assigned to the first WPR 2200a. Based on this, the first WPR 2200a may determine a time slot during which it becomes activated. Similarly, the WPC 2100 transmits, to the second WPR 2200*b*, a message including information on a power transmission mode and scheduling information. The scheduling information may include information on time slot division and information that indicates a time slot assigned with the second WPR 2200*b*.

After transmitting a message including a power transmission mode and scheduling information to each WPR 2200, the WPC 2100 starts transmitting power to each WPR 2200.

For example, in the case where the first WPR 2200*a* and the second WPR 2200*b* comply with different standards, a power transmission interval may be divided into time slots for the first WPR 2200*a* and the second WPR 2200*b*, respectively. The WPC 2100 transmits power to the first WPR 2200*a* during the first time slot, and transmits power to the second WPR 2200*b* during the second time slot. In this case, the first WPR 2200*a* may be activated for the first time slot assigned thereto, but inactivated during the second time slot. In addition, the second WPR 2200*b* may be activated for the second time slot assigned thereto, but inactivated during the first time slot.

Once the first time slot starts, the WPC 2100 transmits test power to the first WPR 2200*a*, as illustrated in FIG. 11. As illustrated in FIG. 11, there may be one or more first WPRs 2200*a*. In the case where there are a plurality of the first WPRs 2200*a*, the WPC 2100 may transmit wireless power to a plurality of the first WPRs 2200*a* in the simultaneous mode or the TDMA mode (in a manner in which a time slot is divided into sub time slots and each of the first WPRs 2200*a* is assigned with a different sub time slot). The same manner may be applied to the second time slot in the case where there are a plurality of the second WPRs 2200*b*.

In response to receipt of the test power, the first WPR 2200*a* may feedback, to the WPC 2100, at least one of a power value, a voltage value, and a current value regarding the received power. The WPC 2100 may control power to be transmitted or perform impedance matching based on the value fed back from the first WPR 2200*a*, and transmit wireless power to the first WPR 2200*a* based on this. During transmission of wireless power, the first WPR 2200*a* may periodically feedback information on received power (a power value, a current value, and the like) to the WPC 2100. Then, accordingly, the WPC 2100 may control power to be transmitted and perform impedance matching. Upon the end of the first time slot, the WPC 2100 transmits, to the first WPR 2200*a*, a message indicating the end of the first time slot. Accordingly, the first WPR 2200*a* may be informed that the first time slot ends, and become inactivated. At this point, the message indicating the end of the first time slot may be transmitted to the second WPR 2200*b*. Accordingly, the second WPR 2200*b* may be informed that the first time slot ends, and become activated to prepare for the second time slot.

Once the second time slot starts, the WPC 2100 test power to the second WPR 2200*b*, as illustrated in FIG. 12. In response to receipt of the test power, the second WPR 2200*b* may feedback, to the WPC 2100, at least one of a power value, a voltage value, and a current value regarding the received power. The WPC 2100 may control power to be transmitted or perform impedance matching based on the value fed back from the second WPR 2200*b*, and then transmit wireless power to the second WPR 2200*b*. During transmission of the wireless power, the second WPR 2200*b* may periodically feedback information on received power (a power value, a current value, and the like). Then, accordingly, the WPC 2100 may control power to be transmitted and perform impedance matching.

Meanwhile, transmission of wireless power during the first time slot and the second time slot may be performed according to the first standard and the second standard, respectively. Specifically, a frequency band for a magnetic field of wireless power transmitted during the first time slot may be different from a frequency band for a magnetic field of wireless power transmitted during the second time slot. In addition, power transmission may be performed using the resonant magnetic coupling scheme during one time slot, and using the inductive coupling scheme during the other time slot. In other words, a magnetic field transmitted during the first time slot and a magnetic field transmitted during the second time slot may be different in at least one of a frequency band or a transmission scheme.

In addition, feedback may be performed differently according to whether the first standard or the second standard is used. It is possible that a current value is fed back during one time slot, while a voltage value is fed back during the other time slot. In addition, it is possible that the feedback is performed using a magnetic field in-band communication, while the feedback is performed using an out-band communication. That is, feedback during the first time slot and feedback during the second time slot may be different in at least one of a frequency band, a communication scheme such as in-band communication and out-band communication, and a type of information included in the feedback.

Upon the end of the second time slot, the WPC 2100 may finish transmitting wireless power.

All the aforementioned operations are not essential for a wireless power transceiving method according to an exemplary embodiment of the present invention, and the wireless power transceiving method may be performed some or all of the aforementioned operations. In addition, the aforementioned examples of the wireless power transceiving method may be performed in combination. Further, the aforementioned operations are not necessarily performed in sequence.

According to the present invention, a single power transmission transmitter may transmit power to a plurality of wireless power receiver using different wireless power transceiving standards.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

DESCRIPTION OF MARK

1000: wireless power system
1100: wireless power transmission apparatus
1110: power transmission module
1111: AC-DC converter
1112: frequency oscillator
1113: power amplifier
1114: impedance matcher
1120: transmitting antenna
1125: communication antenna
1130: communication module
1131: in-band communication module
1132: out-band communication module 1140: controller
1200: wireless power receiving apparatus
1210: receiving antenna
1215: communication antenna
1220: power receiving module
1221: impedance matcher
1222: rectifier
1223: DC-DC converter
1224: battery
1230: communication module
1240: controller
2000: wireless power network
2100: wireless power charger
2200: wireless power receiver

What is claimed is:

1. A wireless power transmitter comprising:
a power transmitting module configured to transmit wireless power using one of a magnetic field of first frequency band and a magnetic field of second frequency band that is different from the first frequency band;
a first communication module;
a second communication module; and
a controller configured to:
transmit a first magnetic field signal of the first frequency band through the power transmitting module;
detect a first response signal regarding the first magnetic field signal through the first communication module;
in response to receipt of the first response signal, search for a first wireless power receiver that transmits and receives wireless power using the first frequency band;
transmit the second magnetic field signal through the power transmitting module;
detect a second response signal regarding the second magnetic field signal through the second communication module; and
in response to receipt of the second response signal, search for a second wireless power receiver that transmits and receives wireless power using the second frequency band.

2. The wireless power transmitter of claim 1, wherein the first communication module is an in-band communication module using the magnetic field of the first frequency band, and the second communication module is an in-band communication module using the magnetic field of the second frequency band.

3. The wireless power transmitter of claim 1, wherein the first communication module is an in-band communication module using the magnetic field of the first frequency band, and the second communication module is an out-band communication module that performs communication using a communication carrier different from the magnetic field.

4. The wireless power transmitter of claim 3, wherein the second communication module is a communication module that performs one of Bluetooth, Zigbee, Wi-Fi, Near Field Communication (NFC), and Radio Frequency Identification (RFID).

5. The wireless power transmitter of claim 1, wherein the controller is further configured to:
determine that the first wireless power transmitter exists within a wireless power transmission range in the case where the first response signal is received during a first preset time period;
determine that the first wireless power transmitter does not exist within the wireless power transmission range in the case where the first response signal is not received during the first preset time period;
determine that the second wireless power transmitter exits within the wireless power transmission range in the case where the second response signal is received during a second preset time period; and
determine that the second wireless power transmitter does not exist within the wireless power transmission range in the case where the second response signal is not received during the second preset time period.

6. The wireless power transmitter of claim 1, wherein the controller is further configured to detect the first response signal during a first preset time period after transmitting the first magnetic field signal, and, if the first present time period expires, transmit the second magnetic field signal.

7. The wireless power transmitter of claim 1, wherein the controller is further configured to, in the case where the first wireless power receiver and the second wireless power receiver are found, assign a first identifier (ID) to the first wireless power receiver and a second ID to the second wireless power receiver.

8. The wireless power transmitter of claim 7, wherein the controller is further configured to transmit a message including the first ID to the first wireless power receiver through the first communication module and a message including the second ID to the second wireless power receiver through the second communication module.

9. A wireless power transmission method comprising:
transmitting a first magnetic field signal of a first frequency band through a power transmitting module that transmits wireless power by using any one of a magnetic field of the first frequency band and a magnetic field of a second frequency band that is different from the first frequency band;
detecting a first response signal regarding the first magnetic signal through the first communication module;
in response to receipt of the first response signal, searching for a first wireless power receiver that transmits and receives wireless power using the first frequency band;
transmitting a second magnetic signal of the second frequency band through the power transmitting module;
detecting a second response signal regarding for the first magnetic field signal through the second communication module; and
in response to receipt of the second response signal, searching for a second wireless power receiver that transmits and receives wireless power using the second frequency band.

10. The wireless power transmission method of claim 9, wherein the first communication module is an in-band communication module using the magnetic field of the first frequency band, and the second communication module is an in-band communication module using the magnetic field of the second frequency band.

11. The wireless power transmission method of claim 9, wherein the first communication module is an in-band communication module using the magnetic field of the first frequency band, and the second communication module is an out-band communication module that performs communication using a communication carrier different from the magnetic.

12. The wireless power transmission method of claim 11, wherein the second communication module is a communication module that performs one of Bluetooth, Zigbee, Wi-Fi, Near Field Communication (NFC), and Radio Frequency Identification (RFID).

13. The wireless power transmission method of claim 9,
wherein the searching for the first wireless power receiver comprises determining that the first wireless power receiver exists in a wireless power transmission range in the case where the first response signal is received during a first preset time period, and determining that the first wireless power receiver does not exist in the wireless power transmission range in the case where the first response signal is not received during the first present time, and
wherein the searching for the second wireless power receiver comprises determining that the second wireless power receiver exists in the wireless power transmission range in the case where the second response signal is received during a second present time period, and determining that the second wireless power receiver does not exists in the wireless power transmission range in the case where the second response signal is not received during the second preset time period.

14. The wireless power transmission method of claim 9,
wherein the detecting of the first response signal is performed for a first present time period after transmission of the first magnetic field signal, and
wherein the detecting of the second response signal is performed when a second present time period expires after transmission of the first magnetic field signal.

15. The wireless power transmission method of claim 9, further comprising:
in a case where the first wireless power receiver and the second wireless power receiver are found, assigning a first identifier (ID) to the first wireless power receiver and a second ID to the second wireless power receiver.

16. The wireless power transmission method of claim 15, further comprising:
transmitting a message including the first ID to the first wireless power receiver through the first communication module; and
transmitting a message including the second ID to the second wireless power receiver through the second communication module.

* * * * *